(12) United States Patent
Spickelmire

(10) Patent No.: US 7,578,092 B2
(45) Date of Patent: Aug. 25, 2009

(54) FISHING LINE PLANAR BOARD

(76) Inventor: William James Spickelmire, P.O. Box 208, Grangeville, ID (US) 83530

(*) Notice: Subject to any disclaimer, the term of this patent is extended or adjusted under 35 U.S.C. 154(b) by 167 days.

(21) Appl. No.: 11/804,047

(22) Filed: May 17, 2007

(65) Prior Publication Data

US 2008/0282598 A1    Nov. 20, 2008

(51) Int. Cl.
*A01K 91/00*    (2006.01)

(52) U.S. Cl. .................................................. 43/43.13

(58) Field of Classification Search ............... 43/43.13, 43/42.36, 42.47, 42.22; D22/129
See application file for complete search history.

(56) References Cited

U.S. PATENT DOCUMENTS

| | | | | |
|---|---|---|---|---|
| 1,542,404 A | * | 6/1925 | Paulson | 43/42.22 |
| 1,956,783 A | * | 5/1934 | Yeo | 43/42.06 |
| 2,535,211 A | * | 12/1950 | Jelinek | 43/42.5 |
| 5,165,196 A | * | 11/1992 | Spickelmire | 43/43.13 |
| 2005/0172538 A1 | * | 8/2005 | Brinkman | 43/42.36 |

* cited by examiner

*Primary Examiner*—Kurt Rowan
(74) *Attorney, Agent, or Firm*—Bergman & Jeckle, PLLC

(57) ABSTRACT

An improved fishing line planar board provides an elongate body having a buoyant cylinder portion with a reduced nose at a forward end portion structurally carrying a longitudinally aligned buoyant dorsal vane and two bilaterally symmetrical opposing arcuate wings, each wing defining a through right slot spacedly behind a rearwardly angulated leading edge for uninterrupted water flow therethrough to reduce cavitation. A stabilizer tip having a slotted sleeve and an angulated planar portion is removably carried at the forward end portion of the cylinder portion proximate the reduced nose and is adjustably positionable thereon to control direction of planar board movement relative to moving water.

2 Claims, 4 Drawing Sheets

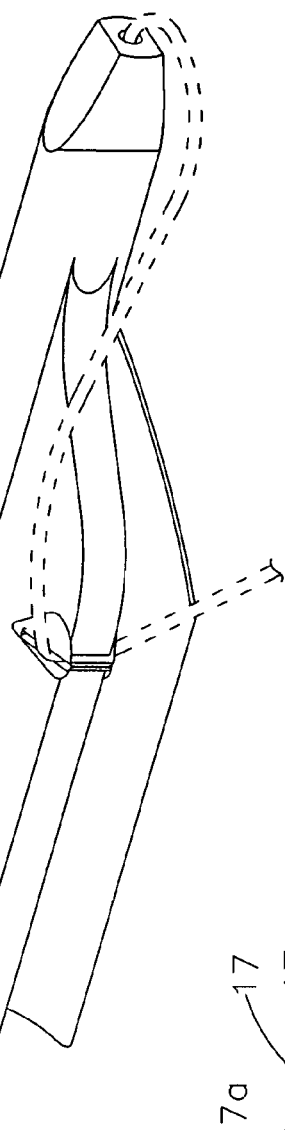
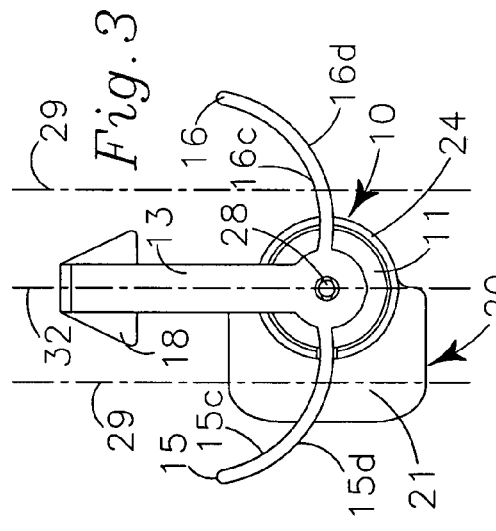
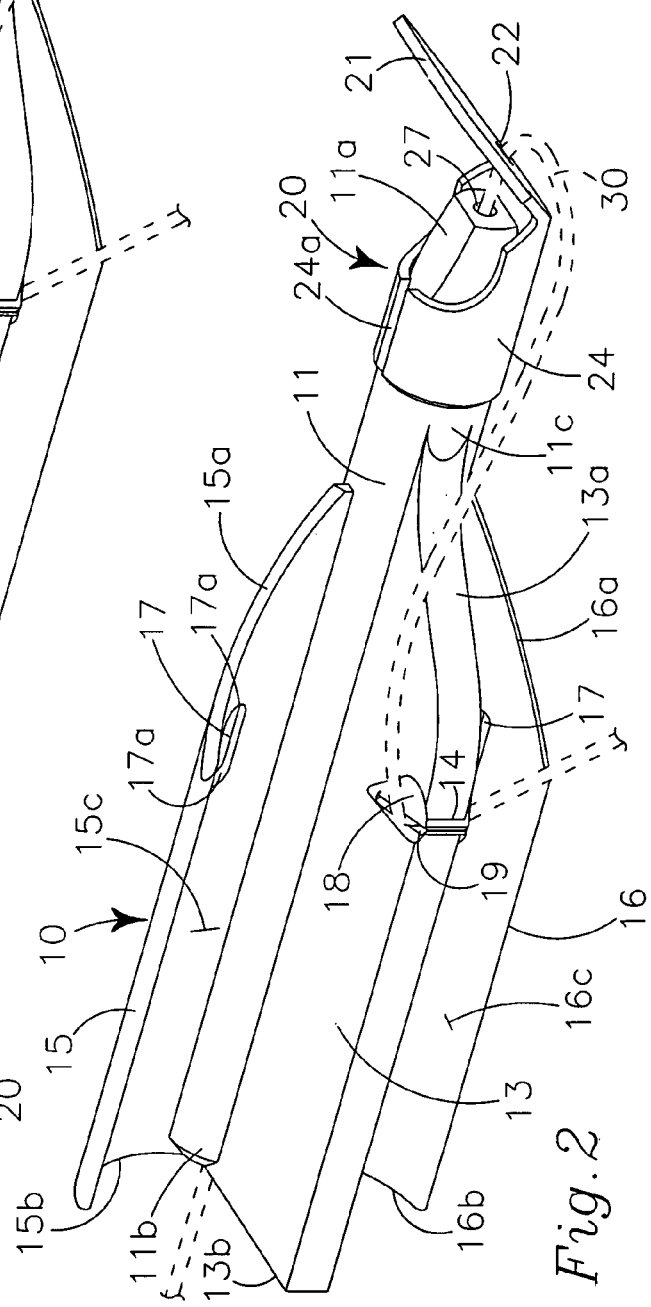

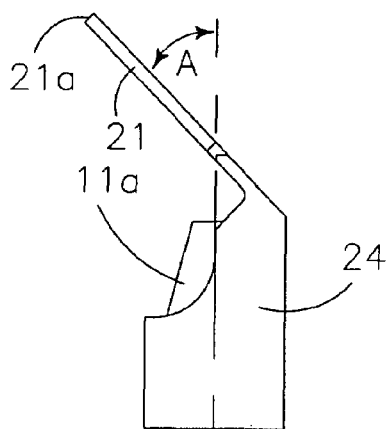
Fig. 4
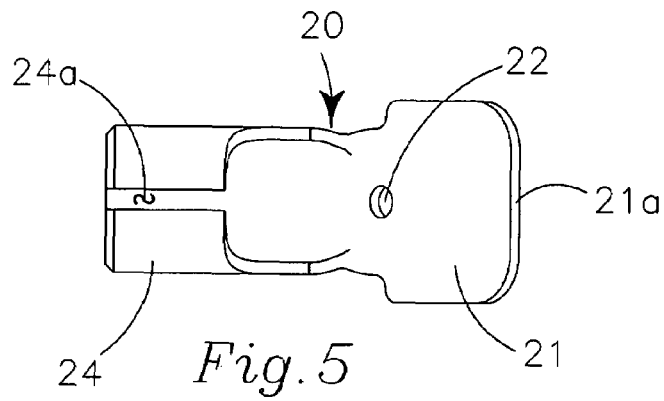
Fig. 5
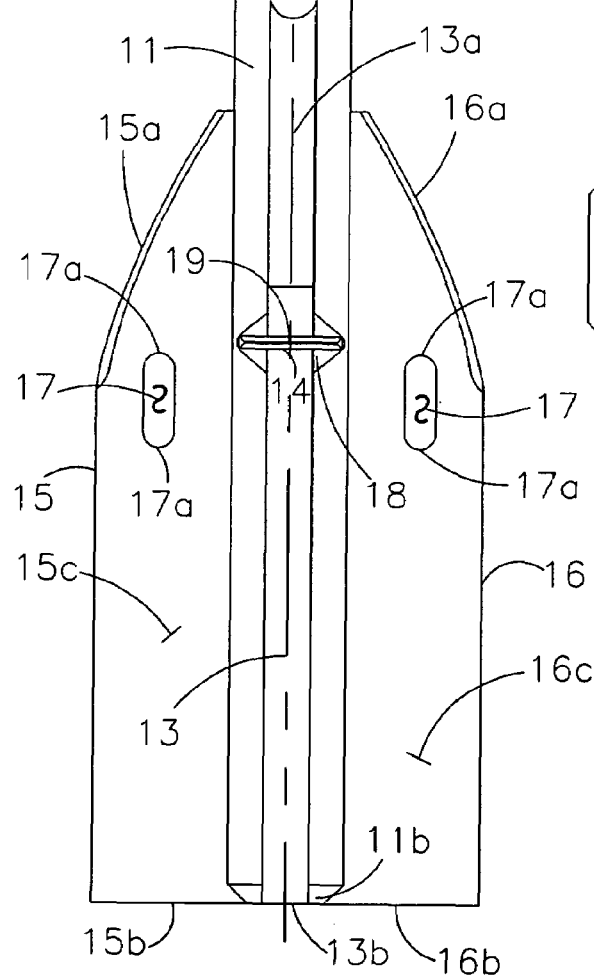
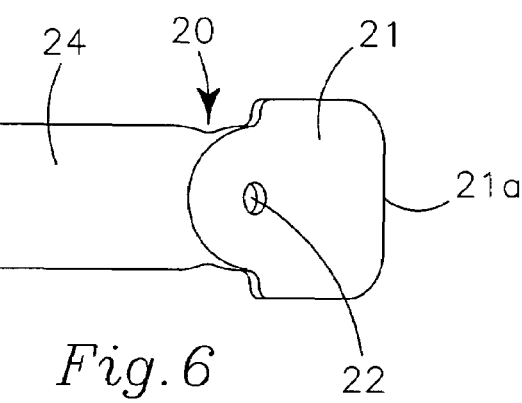
Fig. 6
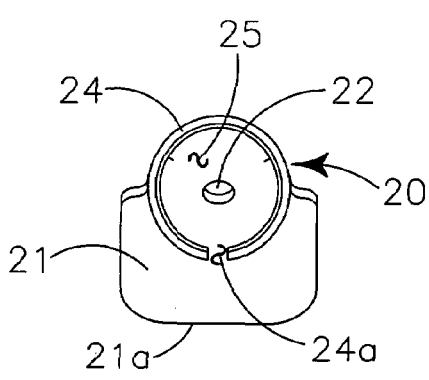
Fig. 7

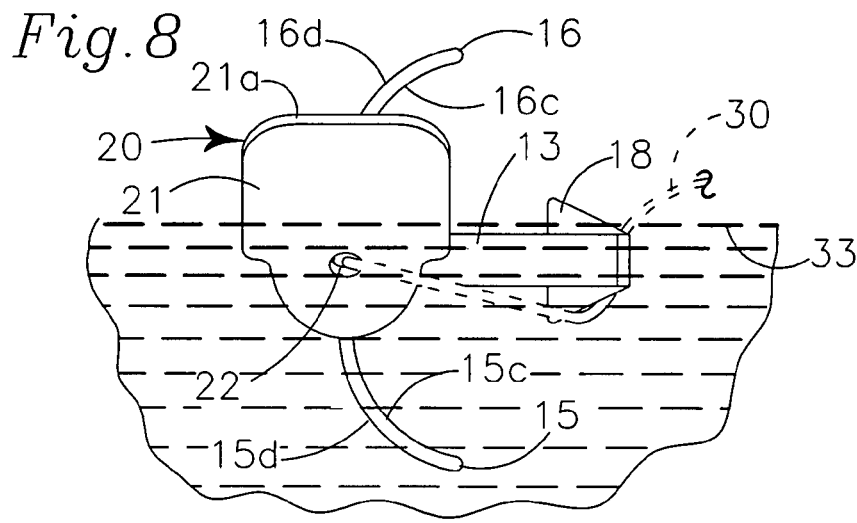
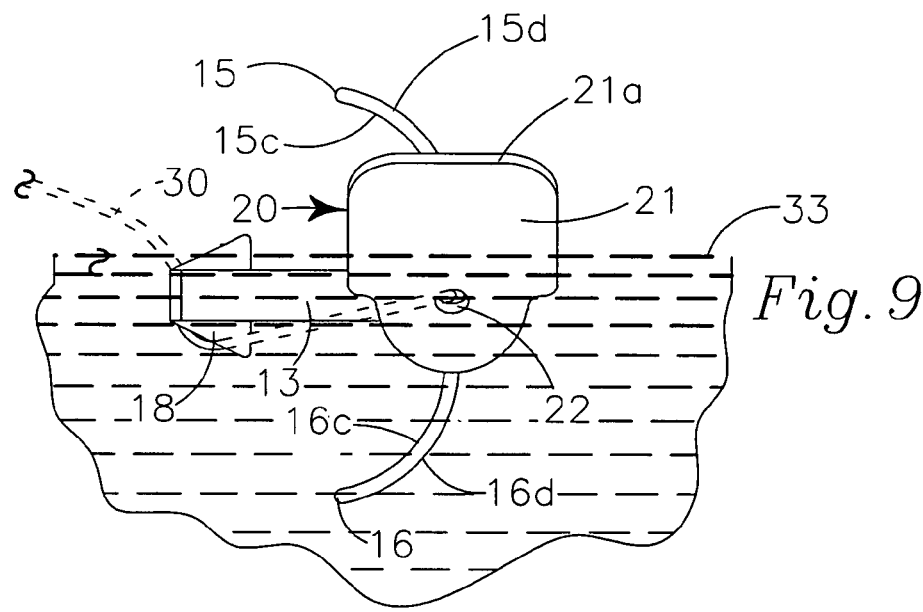
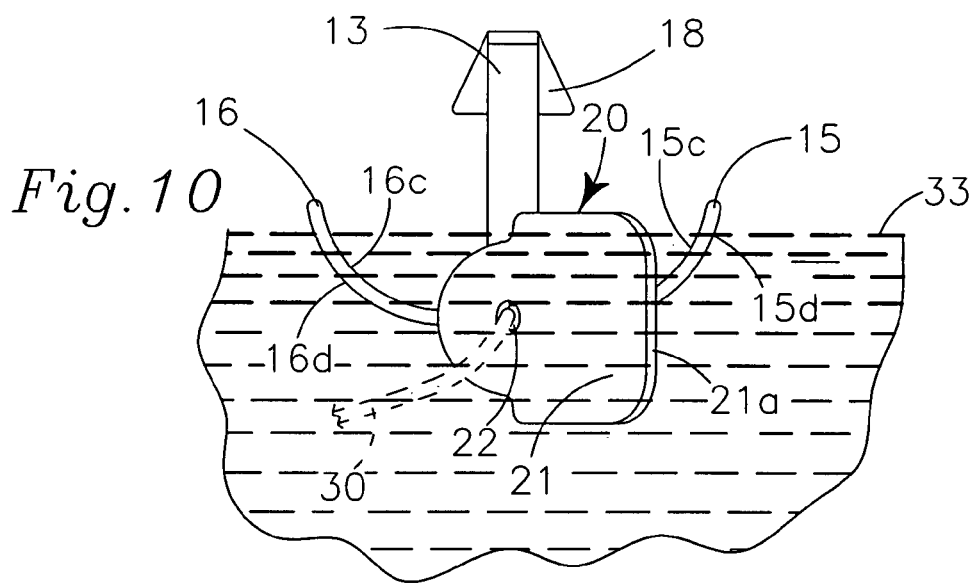

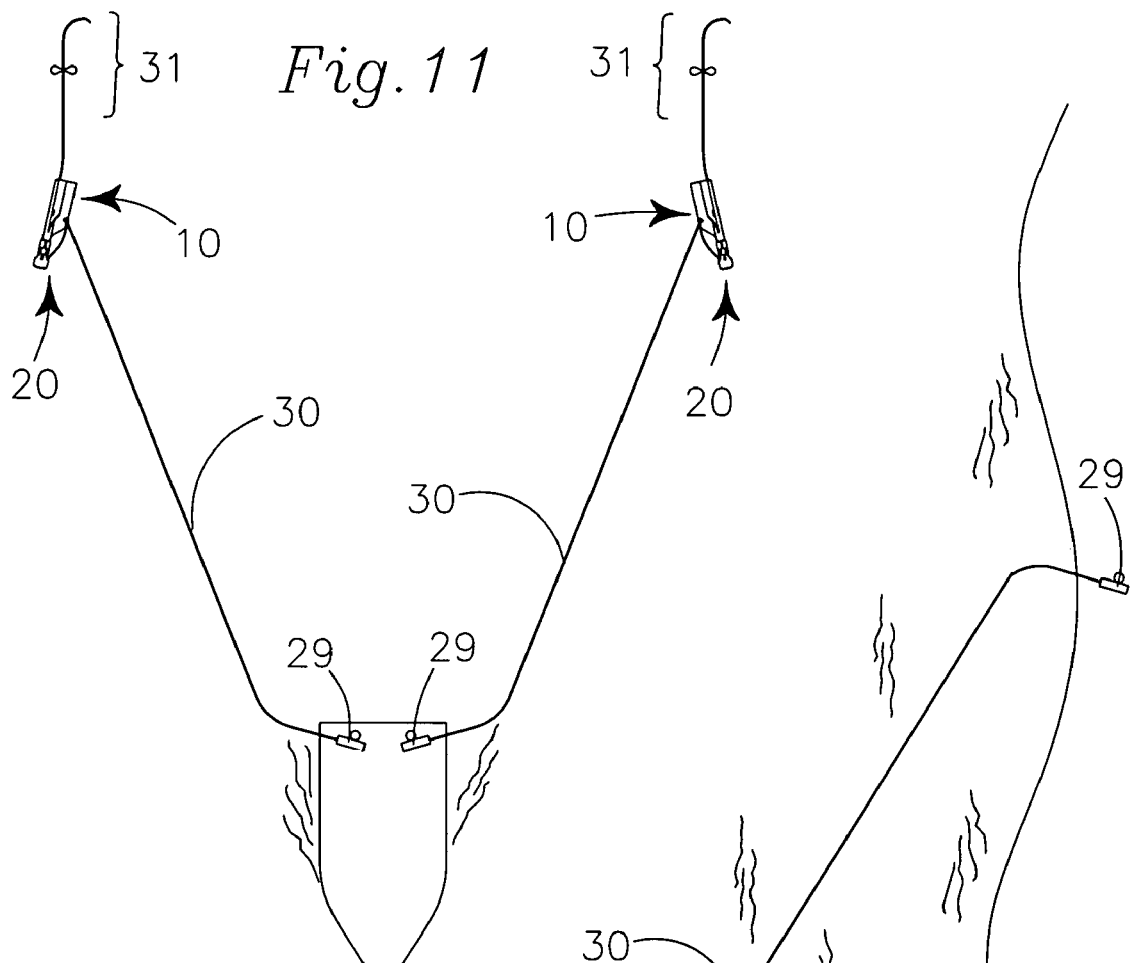
Fig. 11
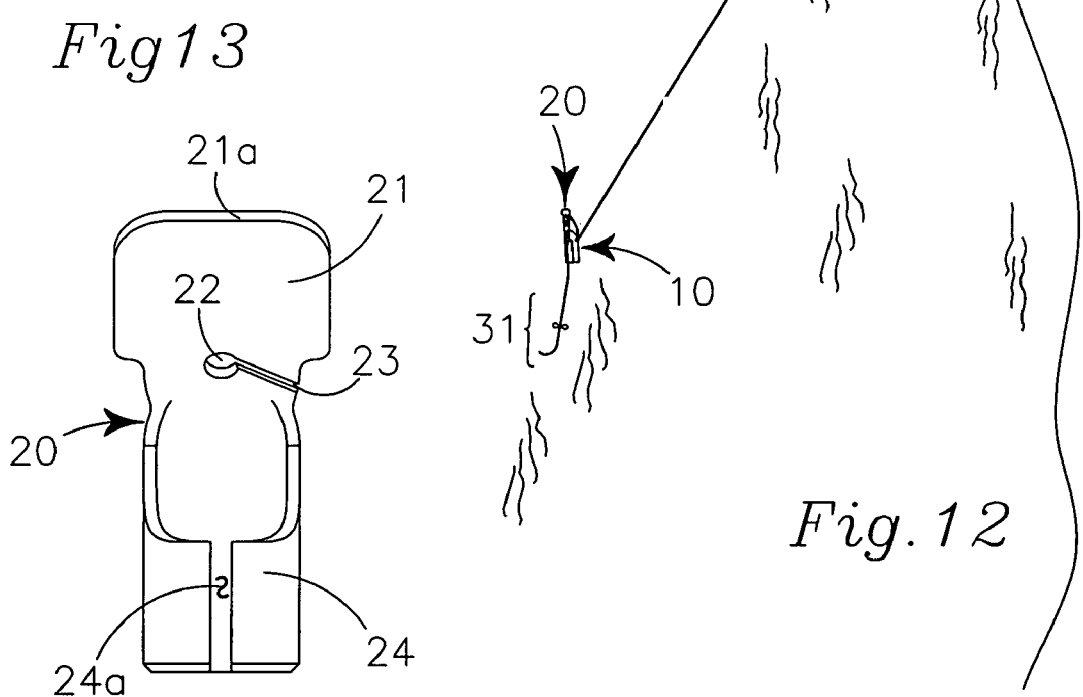
Fig. 13
Fig. 12

FISHING LINE PLANAR BOARD

RELATED APPLICATIONS

There are no applications related hereto heretofore filed in this or in any foreign country. This invention is an improvement to the inventions disclosed in the Inventor's Patents U.S. Pat. No. 5,355,615 issued Oct. 18, 1994, U.S. Pat. No. 5,165,196 issued Nov. 24, 1992 and U.S. Des. No. 330,752 issued Nov. 3, 1992.

BACKGROUND OF INVENTION

1. Field of Invention

This invention relates to fishing line spreaders, and more particularly to planar boards that move fishing lines in a direction angularly to the direction of the water force applied to the planar board.

2. Background and Description of Prior Art

When fishing lines are placed in a volume of moving water, the fishing line naturally moves to a position having the least amount of resistance in the moving water. When trolling, the fishing line will trail directly behind the moving boat. When stream fishing or river fishing, the line will swing in the water current to a position generally parallel to and immediately adjacent the shore. The fishing line will not, without aid, remain laterally outward of the boat or outward of the shore. Planar boards provide such aid.

Planar boards may be used while trolling to move a fishing line and trailing lure laterally away from the wake of a boat positioning the lure in less turbulent water and spreading lures laterally away from one another when plural lures are being trolled. Planar boards may also used while stream fishing and river fishing to move fishing lines and trailing lures outward from the stream bank into deeper water where fish may more readily strike the lure. As used herein, the term "lure" encompasses terminal fishing gear attached to a fishing line and used to attract fish and to be bitten by fish including but not limited to flashers, swivels, hooks, natural baits and artificial baits.

Known planar boards are somewhat flat structures having a triangular shaped leading end portion and are releasably attachable to a fishing line forward of a lure by various means. The fishing line attachment point is spacedly rearward the leading end and the planar board pivots thereabout to maintain an angular orientation relative to the moving water. Water moving on the surfaces of the planar board cause the planar board to act like a sail and move angularly relative to the moving water.

A drawback to known planar boards is that they are unstable in rough water, they cavitate which causes erratic movement, and they porpoise when they are trolled too fast or are used in rivers and streams having fast moving current.

Cavitation occurs when a pressure differential forms between the forward and rearward sides of the submerged portion of a planar board. When the pressure differential becomes too great, air bubbles form on the rearward side of the submerged portion which disrupts surface contact with the water causing the planar board to "jerk" back and forth causing erratic movement.

When trolled too fast, or used in fast moving water, known planar boards are known to "porpoise" and otherwise "jump" out of the water and then re-enter the water at a downward angle, forward end portion first, causing the planar board to "dive" below the surface responsively pulling the trailing lure below the surface as well.

Unstable, cavitating and porpoising planar boards move erratically in the water and this erratic movement is transferred to the trailing lure through the fishing line therebetween. This erratic lure movement tends to frighten fish that might otherwise be attracted to the lure.

What is needed is a planar board that is stable in rough water, does not cavitate, does not porpoise and does not dive below the water surface.

My invention overcomes various of the aforementioned drawbacks by providing an improved planar board for fishing having an elongated buoyant cylindrical body structurally carrying a radially extending dorsal vane and two bilaterally symmetrical opposing arcuate wings. The dorsal vane carries a line gripper for releasable engagement with a fishing line. Each wing defines a through slot spacedly rearward a leading edge that acts as a fluid nozzle allowing water to pass therethrough preventing air bubble formation and cavitation and causing the planar board to move in a generally level orientation on the surface of the water, even when the water surface is rough with waves and ripples. A stabilizer tip having a slotted sleeve and an angulated planar portion is removably adjustably carried at a reduced forward nose portion of the cylindrical body and extends forwardly from the body preventing the planar board from diving. Rotating the stabilizer tip axially on the body allows a user to determine which direction the planar board will travel relative to the moving water.

My invention does not reside in any single one of the identified features individually but rather in the synergistic combination of all of its structures, which give rise to the functions necessarily flowing therefrom as hereinafter claimed.

SUMMARY

My improved fishing line planar board generally provides an elongate body having a buoyant cylinder portion with a reduced nose at a forward end portion structurally carrying a longitudinally aligned buoyant dorsal vane and two bilaterally symmetrical opposing arcuate wings, each wing defining a through right slot spacedly behind a rearwardly angulated leading edge. A stabilizer tip having a slotted sleeve and an angulated planar portion is removably carried at the forward end portion of the cylinder portion proximate the reduced nose and is adjustably positionable thereon.

In providing such an apparatus it is:

a principal object to provide an improved planar board for fishing lines that is stable in variable water conditions.

a further object to provide such a planar board that is stable in fast moving water.

a further object to provide such a planar board that does not porpoise.

a further object to provide such a planar board that does not dive below the water surface.

a further object to provide such a planar board that moves across the water surface angularly to the direction of the moving water in a level orientation.

a further object to provide such a planar board having an adjustable stabilizer tip that allows a user to determine which direction the planar board will travel.

a still further object to provide such a planar board that does not cavitate.

Other and further objects of my invention will appear from the following specification and accompanying drawings which form a part hereof. In carrying out the objects of my invention it is to be understood that its structures and features are susceptible to change in design and arrangement with only one preferred and practical embodiment of the best known mode being illustrated in the accompanying drawings and specified as is required.

BRIEF DESCRIPTIONS OF DRAWINGS

In the accompanying drawings which form a part hereof and wherein like numbers refer to similar parts throughout:

FIG. 1 is an isometric front and top view of a prior art planar board.

FIG. 2 is an isometric front and top view of my improved planar board showing the slots in the wings and the stabilizer tip on the reduced nose portion of the body.

FIG. 3 is an orthographic back view of my improved planar board.

FIG. 4 is an orthographic top view of my improved planar board with the stabilizer tip rotated toward one wing.

FIG. 5 is an orthographic top view of the stabilizer tip showing the slotted sleeve.

FIG. 6 is an orthographic bottom view of the stabilizer tip.

FIG. 7 is an orthographic back view of the stabilizer tip showing the channel defined by the slotted sleeve, the slot in the slotted sleeve and the fishing line hole in the angulated planar portion.

FIG. 8 is an orthographic front view of my improved planar board in a volume of water with the stabilizer tip oriented to move the planar board angularly to the left.

FIG. 9 is an orthographic front view of my improved planar board in a volume of water with the stabilizer tip oriented to move the planar board angularly to the right.

FIG. 10 is an orthographic front view of my improved planar board in a volume of water showing the fishing line detached from the line gripper, the planar board oriented to move freely axially along the fishing line.

FIG. 11 is a diagrammatic plan view of two planar boards being trolled behind a boat with one planar board moving angularly to the left and one planar board moving angularly to the right.

FIG. 12 is a diagrammatic view of my improved planar board being used in a river showing the planar board moving outwardly in the current away from the shore.

FIG. 13 is an orthographic top view of a second embodiment of the stabilizer tip showing a line slot in the angulated planar portion communicating with the fishing line hole.

DESCRIPTION OF PREFERRED EMBODIMENT

As used herein, the term "forward", its derivatives, and grammatical equivalents refers to the portion of the planar board that is closest to an associated fishing pole. The term "rearward", its derivatives, and grammatical equivalents refers to the portion of the planar boar that is most distant from the associated fishing pole. As used herein, the term "lure" encompasses terminal fishing gear attached to a fishing line and used to attract fish and to be bitten by fish including, but not limited to, flashers, swivels, hooks, natural baits and artificial baits.

My improved fishing line planar board is an improvement to the Fish Line Rudder described in U.S. Pat. No. 5,165,196 issued Nov. 24, 1992 to Spickelmire and an improvement to U.S. Design Pat. No. 330,752 issued Nov. 3, 1992 to Spickelmire.

My improved fishing line planar board provides a body 10 and a stabilizer tip 20.

The body 10 has an elongated cylinder portion 11 with a reduced nose 11a at a forward end portion, an opposing rearward end portion 11b and defines an axially aligned medial channel (not shown) communicating therebetween. The cylinder portion 11 is buoyant having air filled internal chambers (not shown) that provide floatation or is formed of a solid buoyant material. The cylinder portion 11 structurally carries a longitudinally elongate radially extending dorsal vane 13 on a top portion 11c and two opposing longitudinally elongate wings 15, 16 that are arcuate in cross section. The body 10 is bilaterally symmetrical about a central vertical reference plane 32. (FIG. 3).

The dorsal vane 13 is buoyant and has a rearwardly angulated leading edge 13a originating spacedly rearward the nose 11a and a rectilinear trailing edge 13b. A line attachment notch 14 is defined in an edge portion of the dorsal vane 13 spacedly rearward the leading edge 13a and opposite and perpendicular to the cylinder portion 11. The notch 14 carries a line gripper 18 that is preferably made of a piece of rubber folded over upon itself forming a crease (not shown) and inserted into the line attachment notch 14, crease (not shown) first. The line gripper 18 forms a medial groove 19 between its immediately adjacent folded over portions in which a fishing line 30 may be inserted and positionally maintained to prevent the body 10 from moving axially along the fishing line 30 closer to or away from a trailing lure 31.

Each wing 15, 16 is structurally carried by the cylinder portion 11 and is longitudinally elongate having a rearwardly angulated leading edge portion 15a, 16a originating spacedly rearward the reduced nose 11a and having a rectilinear trailing edge portion 15b, 16b adjacent the rearward end portion 11b of the cylinder 11. Each wing 15, 16 is arcuate in cross section curving toward the dorsal vane 13 (FIG. 3) forming a concave surface 15c, 16c adjacent the dorsal vane 13 and a convex surface 15d, 16d opposite the dorsal vane 13.

A through right slot 17 is defined in each wing 15, 16 at a generally laterally medial position and longer dimension of each slot 17 is parallel to the dorsal vane 13. Each slot 17 has opposing hemispherical end portions 17a and an imaginary line 29 passing axially through the center of each hemispherical end portion 17a is parallel to the central vertical reference plane 32. (FIG. 3).

The stabilizer tip 20 is removably carried on the cylinder portion 11 proximate the reduced nose 11a and is adjustably positionable thereon. The stabilizer tip 20 has a slotted sleeve 24 defining a channel 25 therethrough and an angulated planar portion 21 structurally attached to and extending forwardly from an edge portion of the slotted sleeve 24. The slotted sleeve 24 is formed of a resiliently deformable material having retentive memory, such as poly-vinyl chloride (PVC). An axially aligned slot 24a defined in the sleeve 24 permits diametric expansion allowing the sleeve 24 to fit onto and circumferentially engage with the cylinder portion 11, while the resiliency of the material provides contraction forces that positionally maintain the sleeve 24 thereon.

The angulated planar portion 21 is generally rectilinear and is structurally carried by the slotted sleeve 24 at a forward edge portion diametrically opposite slot 24a. The angulated planar portion 21 extends angularly forwardly from the slotted sleeve 24 and is oriented relative thereto so that an imaginary line (not shown) passing axially through the center of the channel 25 will intersect the planar portion 21 at an angle A, relative to parallel, between about fifteen degrees and fifty-five degrees but preferably at 40 degrees. (FIG. 4). A fishing line hole 22 is defined in the planar portion 21 at the position where the imaginary line (not shown) passing axially through the center of the channel 25 intersects the planar portion 21. (FIG. 7).

In a second embodiment (FIG. 13), a fishing line slot 23 may be defined in the angulated planar portion 21 communicating from one lateral edge thereof to the fishing line hole 22. The fishing line slot 23 permits various sizes and configurations of stabilizer tips 20 to be installed on the body 10 without the necessity of completely withdrawing the fishing line 30 from the medial channel (not shown) of the cylinder portion 11.

Having described the structure of my improved fishing line planar board its operation may be understood.

The stabilizer tip 20 is installed on the body 10 by inserting the reduced nose 11a into the channel 25 defined by the slotted sleeve 24. The angulated planar portion 21 of the stabilizer tip 20 extends forwardly from the body 10.

A fishing line 30, preferably connected to a fishing pole 29 is threaded first through the fishing line hole 22 defined in the angulated planar portion 21 of the stabilizer tip 20 from the forward side opposite the slotted sleeve 24. The fishing line 30 is then threaded through the medial through channel (not shown) defined by the cylinder portion 11 entering through orifice 27 defined in the reduced nose 11a, passing longitudinally through the cylinder portion 11 and exiting orifice 28 defined in the rearward end portion 11b of the cylinder portion 11.

After the fishing line 30 is passed through medial channel (not shown) defined by the cylinder portion 11, a lure 31 is fastened to the fishing line 30 by known means, such as with a swivel (not shown) or a knot (not shown). The user may also fasten a pre-positioned stop (not shown), such as a "split-shot" (not shown) on the fishing line 30 forward of the lure 31 and rearward of the body 10 to prevent the body 10 from moving axially along the fishing line 30 and interfering with the lure 31 and any fish that might be thereon.

User determines how far behind the body 10 user wishes the lure 31 to trail. After determining this distance, the user grasps the fishing line 30 forward of the angulated planar portion 21 of the stabilizer tip 20, and inserts the fishing line 30 into the groove 19 defined by the line gripper 18 carried in the line attachment notch 14. The user rotates the stabilizer tip 20 axially on the cylinder portion 11 so that rectilinear leading edge 21a of the angulated planar portion 21 is generally parallel to the dorsal vane 13, when viewed from the front. (FIGS. 8, 9, 10).

When placed in a volume of water that moves relative to the body 10, either as a result of being towed (FIG. 11), or in the current of a stream (FIG. 12), the planar board will move angularly to the direction of the water force applied to it, generally laterally across and against the current, pulling the lure 31 therebehind. The body 10 will orient itself with the lower wing 15, 16 submerged below the water surface, the cylinder portion 11 generally parallel with the water surface and the upper wing 15, 16 above the water surface. (FIGS. 8, 9 and 10).

As shown in FIG. 9, when the stabilizer tip 20 is aligned so that the angulated planar portion 21 is oriented upwardly and the dorsal vane 13 is to the left, the body 10 will move through the water to the right as viewed from a towing boat (FIG. 11). As shown in FIG. 8, when the stabilizer tip 20 is aligned so that the angulated planar portion 21 is oriented upwardly and the dorsal vane 13 is to the right, the body 10 will move through the water to the left as viewed from a towing boat (FIG. 11). The axial orientation of the stabilizer tip 20 can likewise be adjusted relative to the dorsal vane 13 to control movement of the body 10, the attached fishing line 30 and the trailing lure 31 away from a shore. (FIG. 12)

The angulated planar portion 21 of the stabilizer tip 20 prevents the body 10 from diving below the surface and tends to "smooth out" ripples and waves on the water surface minimizing erratic movement. If the body 10 starts to porpoise, such as by being pulled over the top of a wave, the angulated planar portion 21 will prevent the body 10 from diving by acting as a "inclined bow" causing the body 10 to remain on the water surface.

During use, water passes about the body 10 and on the concave surface 15c, 16c of the submerged wing 15, 16 as well as on the convex surface 15d, 16d of the submerged wing 15, 16. The angular movement of the planar board relative to the moving water causes a pressure differential between the water immediately forward of the submerged wing 15, 16 and immediately behind the submerged wing 15, 16. Some amount of water moving on the concave surface 15c, 16c of the submerged wing 15, 16 enters and passes through the slot 17 exiting to the rearward convex surface 15d, 16d of the submerged wing 15, 16. The water flowing through the slot 17 reduces cavitation, by replacing air bubbles on the convex surface 15d, 16d of the submerged wing 15, 16 with water. Uninterrupted water flowing along the convex surface 15d, 16d stabilizes the body 10 and reduces cavitation and erratic movement.

When a fish strikes the lure 31 causing a sharp "tug" on the fishing line 30, the fishing line 30 is dislodged from the line gripper 18. The body 10 will automatically align itself longitudinally with the fishing line 30 effectively minimizing hydro-dynamic drag allowing the user to "play" the fish as desired. If no fish strikes the lure 31, the user may dislodge the fishing line 30 from the line gripper 18 by sharply jerking upwardly on the fishing pole 29. The fishing line 30, the lure 31 and the body 10 carrying the stabilizer tip 20 may thereafter be reeled in and retrieved.

The foregoing description of my invention is necessarily of a detailed nature so that a specific embodiment of a best mode may be set forth as is required, but it is to be understood that various modifications of details, and rearrangement, substitution and multiplication of parts may be resorted to without departing from its spirit, essence or scope.

Having thusly described my invention, what I desire to protect by Letters Patent, and

I claim:

1. An improvement for a fishing line planar board having a buoyant cylindrical body with a reduced nose at a forward end portion and a rectilinear rearward end portion defining an axial through channel for a fishing line therebetween and carrying a buoyant radially extending longitudinally elongate dorsal vane and two longitudinally elongate arcuate wings, the dorsal vane defining a fishing line notch in an edge portion carrying a fishing line gripper, the improvement comprising in combination:

a stabilizer tip having,
    a slotted sleeve defining a channel for engagement with the forward end portion of the cylindrical body proximate the reduced nose,
    an angulated planar portion interconnected to the slotted sleeve defining a fishing line hole, the angulated planar portion extending angularly across axis of the channel defined by the slotted sleeve, and
    the stabilizer tip is formed of resiliently deformable Poly-Vinyl Chloride having retentive memory; and
  a through slot defined in each arcuate wing for the passage of water therethrough, and
    the through slot defined in each arcuate wing has two opposing hemispherical end portions and an imaginary line passing axially through the center of each hemispherical end portion is parallel to the dorsal vane.

2. An improvement for a fishing line planar board having a buoyant cylindrical body with a reduced nose at a forward end portion and a rectilinear rearward end portion, defining an axial through channel for a fishing line therebetween and carrying a buoyant radially extending longitudinally elongate dorsal vane and two longitudinally elongate arcuate wings, the dorsal vane defining a fishing line notch in an edge portion carrying a fishing line gripper, the improvement comprising in combination:

a stabilizer tip adjustably positionable on forward end portion of cylindrical body proximate the reduced nose, the stabilizer tip having, a slotted sleeve, formed of a resiliently deformable material having retentive memory, defining a channel for engagement with the cylindrical body, and an angulated planar portion interconnected to the slotted sleeve defining a fishing line hole and a fishing line slot communicating from one edge to the fishing line hole, the angulated planar portion extending angularly across axis of the channel defined by the slotted sleeve, the angle of intersection between the axis of the channel and the angulated planar portion between fifteen degrees and fifty-five degrees; and a through right slot defined in each arcuate wing for the passage of water therethrough, each slot having a longer dimension parallel to the longitudinal length of the dorsal vane and two opposing hemispherical end portions.

* * * * *